Oct. 13, 1970 — E. G. KATSOULIS — 3,533,845
LOW-CURRENT, LOW-CAPACITY METAL/AIR BATTERY
Filed Jan. 27, 1967 — 2 Sheets-Sheet 1
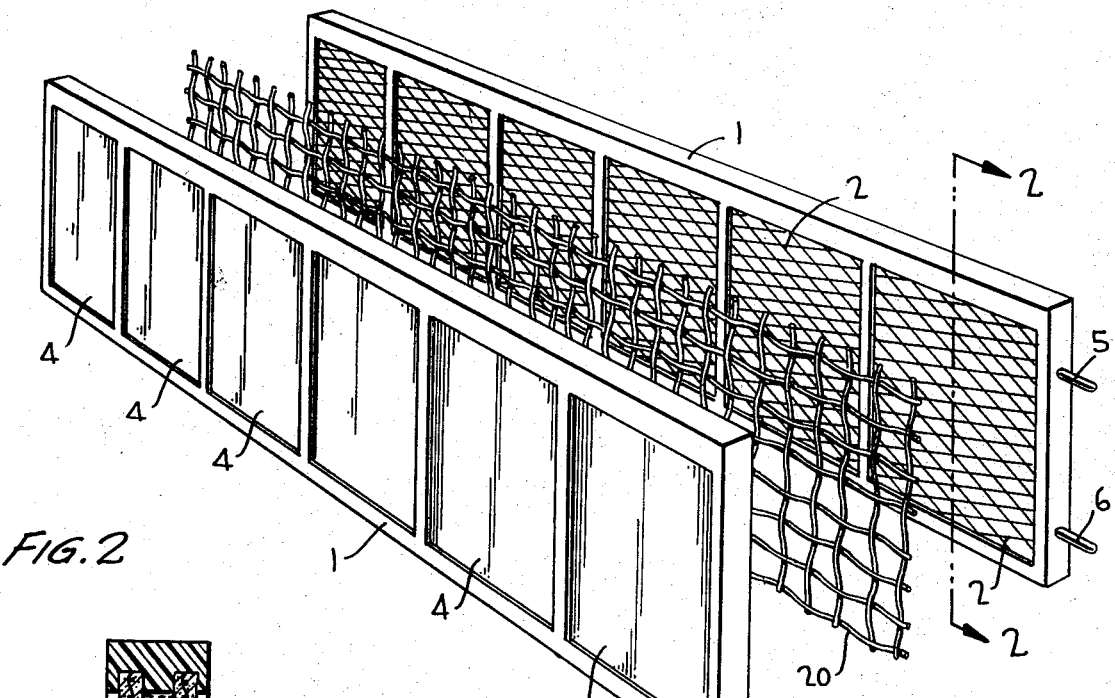
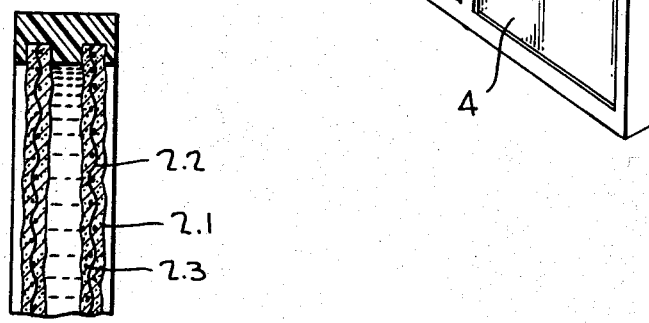
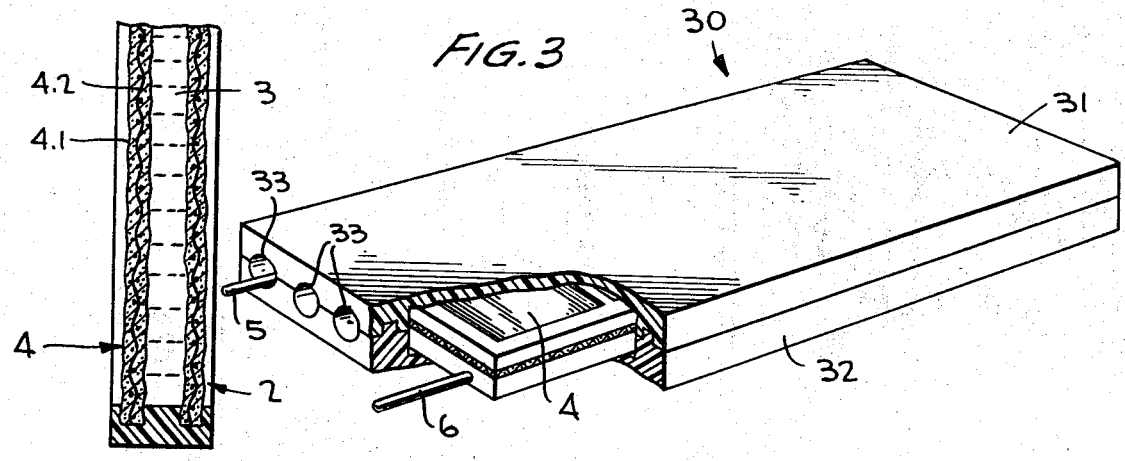
INVENTOR,
EMANUEL G. KATSOULIS

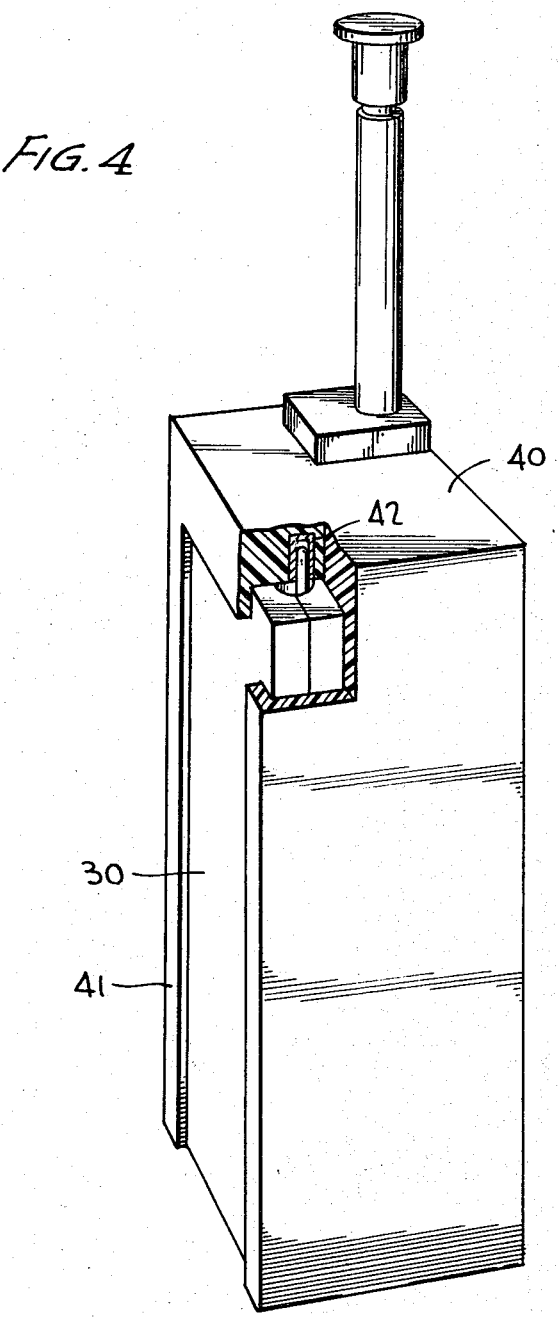

United States Patent Office 3,533,845
Patented Oct. 13, 1970

3,533,845
LOW-CURRENT, LOW-CAPACITY METAL/AIR BATTERY
Emanuel G. Katsoulis, Long Island City, N.Y., assignor to Leesona Corporation, Warwick, R.I., a corporation of Massachusetts
Filed Jan. 27, 1967, Ser. No. 612,269
Int. Cl. H01m 27/00
U.S. Cl. 136—86    6 Claims

ABSTRACT OF THE DISCLOSURE

A lightweight metal/air or metal/oxygen battery is disclosed comprising a plurality of single cells in a common frame. The single cells comprise a consumable metal anode, a lightweight non-consumable cathode, and an electrolyte separating the anode and cathode. The cathode comprises a gas permeable, liquid impermeable hydrophobic membrane and an electrocatalyst at one surface. The cathode is positioned in the cell in order that the electrocatalyst is in contact with the electrolyte and the hydrophobic membrane is in contact with an air or oxygen supply. Two frames of the single cells are enclosed in a suitable housing with the cathodes facing each other and separated by an intercell spacer. The battery is capable of low current, low capacity application at temperatures at least as low as minus 40° C.

FIELD OF INVENTION

This invention is directed to an improved battery. More particularly, the invention is directed to an improved air or oxygen battery which is light in weight, designed for low current, low capacity applications, and which will operate at temperatures down to at least as low as —40° C. Essentially, the battery comprises a plurality of single cells each of which is an integral part of one common frame. The individual cells are made up of one consumable metal anode and one non-consumable lightweight air or oxygen depolarized cathode separated by an electrolyte. The frame of the single cells are enclosed in a suitable housing with the cathodes facing each other and separated by an intercell spacer.

BACKGROUND OF INVENTION AND PRIOR ART

Metal/air or metal/oxygen (hereinafter for convenience metal/air will include both metal/air and metal/oxygen) cells, with emphasis directed to a bi-cell design, have been described in commonly assigned Oswin application Ser. No. 533,516; Rosansky application Ser. No. 517,604 now Patent No. 3,378,406; and Oswin and Chodosh application Ser. No. 517,603 now Patent No. 3,436,270. The bi-cell designs evolve from high current, low capacity requirements. As a result, large thick metal anodes were employed and in order to effectively discharge the anode, two parallel connected cathodes, one facing each surface of the anode, were used. In a battery, as apparent from the aforesaid Rosansky application, several bi-cells are stacked so that two cathodes, one from each neighboring bi-cell, share a common air cavity. The battery design ensures good low temperature peformance down to at least as low as about —40° C., since the heat generated by the cell inefficiencies is retained in the air cavity. Accordingly, the cell is effectively operated at above ambient temperatures.

Although the bi-cell design is highly desirable for high current, high capacity requirements, it is not efficient for low current, low capacity requirements such as needed for air/sea rescue equipment. More specifically, the bi-cell design is undesirable because the two cathodes of the design are not needed to discharge one anode, i.e., one cathode is sufficient and, furthermore, the bi-cell frame weight is redundant preventing high specific energies. It is still essential, however, that the low current, low capacity cell be capable of operating at extremely low temperatures, i.e., in the neighborhood of about minus 40° C.

OBJECTS AND BRIEF DESCRIPTION OF INVENTION

It is a primary object of the present invention to provide a lightweight metal/air battery for low current, low capacity applications which will operate effectively at temperatures down to at least as low as about minus 40° C.

It is another object of the invention to provide a package comprising in combination a lightweight metal/air battery and a radio such as a walkie-talkie used in air/sea rescue or survival equipment.

These and other objects of the invention will become more readily apparent from the following detailed description, with particular emphasis being placed on the drawing.

Briefly, the objects of the present invention are accomplished by utilizing a design whereby a plurality of single cells (one anode and one cathode) are contained in a common frame. Thus, each cell will share some portion of the frame with a neighboring cell. The number of cells and their configuration will be determined by voltage and dimension requirements. As apparent, substantial weight savings are realized by avoiding repeated use of individual frames for each cell. Moreover, according to the invention, two frames of single cells are positioned cathode to cathode separated by an intercell spacer. Accordingly, the heat generated by the cells is partially retained, effectively permitting the operation of the cell above ambient. It is, therefore, possible to operate the cell at a much lower temperature than would otherwise be possible. The battery constructed from the frames of individual cells are particularly effective when used in conjunction with a small radio, since the battery can be fabricated in substantially any configuration desired.

The battery construction, according to the present invention, will be more readily apparent by reference to the drawing wherein like numerals are employed throughout to designate like parts.

THE DRAWING

In the drawing, FIG. 1 is an exploded perspective view of two frames of single cells separated by an intercell spacer;

FIG. 2 is a sectional view along lines 2—2 of FIG. 1 illustrating more completely the construction of the single cell;

FIG. 3 is a perspective view, partly in section, of the two frames of single cells of FIG. 1 encased in a suitable housing; and FIG. 4 is a perspective view illustrative of the battery of FIG. 3 in the environment of a walkie-talkie radio of the type used in air-sea rescue equipment.

More specifically, referring to FIG. 1 of the drawing, a plurality of single cells are formed as an integral part of frame 1. Two of the aforesaid frames of single cells are separated by intercell spacer 20, with the air or oxygen depolarized cathodes 2 facing each other. The intercell spacer allows for the necessary flow of air or oxygen.

Each individual cell as seen in FIG. 2 comprises an anode 4, air depolarized cathode 2 with ion-conductive electrolyte 3 separating the anode and cathode. In the embodiment shown, anode 4 comprises a porous zinc body 4.1 pressed around a conductive screen 4.2. The cathode is made up of a continuous hydrophobic membrane 2.1, a conductive support screen 2.2, and electrocatalyst layer 2.3 pressed into and around the support screen. In the embodiment shown, the hydrophobic membrane is polytetrafluoroethylene and the electrocatalyst is a uniform mixture of silver and mercury bonded with polytetrafluoroethylene particles. The catalyst and bonding agent are present at weight ratio of 7 parts to 3 parts. The electrolyte is a free-flowing solution of aqueous (31 percent) potassium hydroxide. However, it may be desirable to employ a trapped electrolyte, i.e., an electrolyte retained in a suitable matrix.

The two single cell frames separated by the intercell spacer as shown in FIG. 1, are enclosed in interlocking casings 31 and 32 to form a finished battery 30 as shown in FIG. 3. A plurality of vents 33 are at either end of the casing to permit air or oxygen flow. Additionally, the vents can be used to permit electrical contact, i.e., as outlets for leads 5 and 6. As apparent, the single cells can be connected in series or parallel depending upon the particular current and voltage requirements. Casings 31 and 32 can be fabricated from any suitable material such as plastic or metal but are preferably constructed from a plastic such as polymethylmethacrylate or the like.

FIG. 4 illustrates the battery of FIG. 3 in the environment of a walkie-talkie radio. Battery 30 and the radio 40 are retained in operable association by retainer 41. Electrical contact is made through plugs 5 and 6 of the battery which fit into recptacles 42 of the radio.

Although the battery as shown in the drawing is a rectangular structure, due to the nature of the metal/air battery, it can be constructed in substantially any shape or size to meet any requirement. It is not necessary, as it has been in the past, to construct the radio or the like with a housing to hold batteries of a conventional configuration. Accordingly, devices to be energized by the battery can be constructed in a much more compact design than heretofore possible.

The frames of the plurality of single cells are of any insulating material which is capable of withstanding the environment of use. Thermo-setting and thermo-plastic epoxy resins such as those obtained from the condensation reaction of bis-phenol A [2,2-bis(4-hydroxyphenyl) propane] and epichlorohydrin are particularly suitable. However, other resins can be employed such as the phenol formaldehyde and urea formaldehyde thermo-plastic or thermo-setting resins. Such materials are readily available and known to one skilled in the art.

The cathodes and their method of construction which are employed herein are fully described in the aforesaid Oswin application Ser. No. 533,516 and comprise a hydrophobic membrane which is in contact with a conductive metal support screen or mesh and a catalytic layer. The membrane which is to be used can be any material which is hydrophobic and permits the passage of gas, but precludes the flow of aqueous materials. Exemplary materials are the polymers of fluorinated hydrocarbons such as polytetrafluoroethylene, polytrifluoroethylene, polyvinylfluoride, polyvinylidenefluoride, the hydrophobic copolymers of two or more of the above materials or copolymers of such materials with acrylonitrile, methacrylate, polyethylene, and the like. The polymers normally will have a porosity of from about 15 to 85 percent and a uniform pore size distribution of from about 0.01 to about 100 microns and a thickness of about 0.5 to 10 mils. The catalyst used to coat the hydrophobic polymer are the pure elements, alloys, oxides, or mixtures thereof which are effective in promoting an electrochemical reaction. More specifically, operable materials include the elements, alloys, oxides, or mixtures of Group I-B, II-B, IV, V, VI, VII, and VIII metals of the Mendelyeev's Periodic Table. The metal support screen can be any material which conducts an electrical current and will withstand the corrosive environment of the battery. Such materials include nickel, zirconium, titanium, and tungsten screens, expanded meshes, or the like. Moreover, it is possible to apply a hydrophilic polymer or other suitable hydrophilic material such as paper over the catalytic layer which will be in contact with the electrolyte of the battery when in operation.

The anodes which are to be used herein can be any conventional solid electro-conductor employed in a metal/air or metal/oxygen cell such as metals, metalloids, alloys, and heavy metal salts. It is only essential that the material selected be chemically reactive with a compatible electrolyte and be more electro-positive than oxygen. Such materials include lead, zinc, iron, cadmium, aluminum, and magnesium. From the standpoint of cost, capacity, and convenience, zinc is the preferred material. Although the anode can be in the form of a solid or substantially solid metal sheer, it is preferred that the anode be porous. Porous anodes can be made, for example, by sintering select metal powders.

The cells will operate on conventional electrolytes including the alkali materials such as sodium hydroxide, potassium hydroxide, mixtures of potassium or rubidium hydroxide and the like. Acid electrolytes including sulfuric acid, phosphoric acid, and hydrochloric acid can be employed. As is apparent, depending upon the particular electrolyte used, different anode materials can be selected. It is also feasible and at times desirable to employ an electrolyte which is trapped in a suitable matrix such as those made up of hydrophilic polymers, ceramic materials, and the like.

It should be appreciated that the instant invention is not to be construed as being limited by the illustrative embodiment. It is possible to produce still other embodiments without departing from the inventive concept herein disclosed. Such embodiments are within the ability of one skilled in the art.

I claim:

1. A battery unit comprising a plurality of individual cells electrically connected, each having ends and sides constructed and arranged end to end in order that said sides are on the same plane and share a common frame. each of said cells comprising a consumable metal anode and a non-consumable oxygen depolarized cathode comprising a hydrophobic polymer member coated at one surface with a conductive catalytic material, said anode and cathode being separated by an electrolyte with said electrolyte being in contact with said conductive catalytic material on said cathode, the surface of said hydrophobic polymer member which is not in contact with the electrolyte of said cell being substantially uncovered by said frame permitting passage of oxygen to said surface.

2. The battery unit of claim 1 wherein the anode of the cells is porous zinc in contact with a hydrophilic separator and the electrolyte of the cells is impregnated in said separator.

3. A metal/air battery comprising two battery units according to claim 1 and an inter-cell spacer separating said battery units, said units and spacer constructed and arranged to have the cathodes of the two units in contact with said spacer to permit access of air to said cathodes.

4. The battery of claim 3 wherein the anode of the cells is porous zinc in contact with a hydrophilic separator and the electrolyte of the cells is impregnated in said separator.

5. The metal/air battery of claim 4 enclosed in a housing, said housing having openings in the ends thereof to permit flow of air to the cathodes.

6. The battery of claim 5 wherein the housing is plastic.

References Cited
UNITED STATES PATENTS

| | | | |
|---|---|---|---|
| 2,597,119 | 5/1952 | Schumacher et al. | 136—136 |
| 3,043,898 | 7/1962 | Miller et al. | 136—86 |
| 3,126,302 | 3/1964 | Drushella | 136—86 |
| 3,188,242 | 6/1965 | Kordesch et al. | 136—86 |
| 3,393,100 | 7/1968 | Niedrach. | |
| 2,894,053 | 7/1959 | Louzos | 136—87 |
| 480,384 | 8/1892 | Dow | 136—87 |

WINSTON A. DOUGLAS, Primary Examiner

H. A. FEELEY, Assistant Examiner